United States Patent
Esquibel et al.

(10) Patent No.: US 6,662,186 B1
(45) Date of Patent: Dec. 9, 2003

(54) SYSTEM AND METHOD FOR A DATA PROPAGATION FILE FORMAT

(75) Inventors: Daniel M Esquibel, Denver, CO (US); Steven J Simske, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

(21) Appl. No.: 09/616,670

(22) Filed: Jul. 14, 2000

(51) Int. Cl.⁷ .............................................. G06F 17/00
(52) U.S. Cl. ...................... 707/101; 707/203; 717/122; 715/511; 715/523
(58) Field of Search ............................. 707/100–104.1, 707/200–205; 717/120–123; 715/511, 517–525

(56) References Cited

U.S. PATENT DOCUMENTS

| | | | | |
|---|---|---|---|---|
| 5,911,776 A | * | 6/1999 | Guck ....................... | 707/104.1 |
| 6,085,199 A | * | 7/2000 | Rose ............................ | 707/1 |
| 6,233,631 B1 | * | 5/2001 | Dombrowski et al. ........ | 710/33 |
| 6,260,043 B1 | * | 7/2001 | Puri et al. ....................... | 707/1 |
| 6,377,952 B1 | * | 4/2002 | Inohara et al. ............... | 707/101 |

OTHER PUBLICATIONS

IBM TDB (Method for Converting a Multimedia File Format, vol. 39, pp. 7–8, Jan. 1996).*
IBM TDB (Method to Perform Data File Conversion in Displaywrite 4's Merge With Data File Task, vol. 31, p. 392, Aug. 198.*

* cited by examiner

*Primary Examiner*—Shahid Al Alam
*Assistant Examiner*—Joon Hwan Hwang

(57) ABSTRACT

A system and method for propagating data from one file format to another file format analyzes the file format of saved data to determine whether the file can be opened by the requesting application program. If the file is of a format or version different than that of the requesting application program, the data propagation logic analyzes the file to determine the available file formats attached thereto and launches an executable module, either attached to the file or remotely accessible via a resource indicator, to convert the file to a new file of a format and/or version readable by the requesting application program.

27 Claims, 6 Drawing Sheets

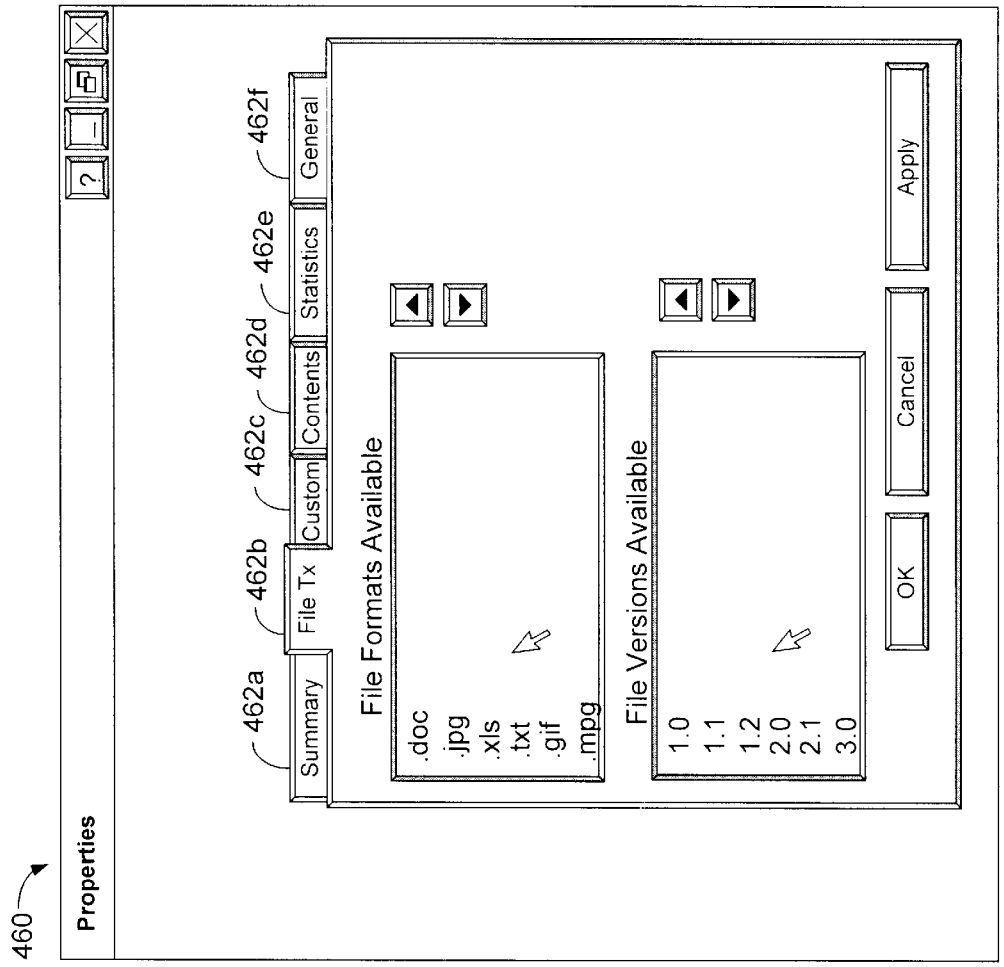

_US 6,662,186 B1_

SYSTEM AND METHOD FOR A DATA PROPAGATION FILE FORMAT

TECHNICAL FIELD

The present invention relates generally to computer systems, and, more particularly, to a system and method for propagating data saved in one file format or version to another file format or version.

BACKGROUND OF THE INVENTION

Many different types of data are used and saved on computer systems. Typically, different types of data are saved in file formats that are specific to the type of data saved. For example, a text file may be saved in a text file format while an image may be saved as a JPEG (joint picture experts group) file format. File formats are typically added to the saved documents as file extensions. For example, a text file may bear the extension ".txt" while an image file may bear the extension ".jpg." These are merely examples, as many additional file formats and application programs exist.

Similarly, different versions of the same file format may coexist. For example, when an application program, such as a word processing program, is released, the application will typically be at version 1.0. As subsequent improvements and modifications are made to the program, updated versions are released. The file extension and version are ways of identifying the type of saved file to an application program. An application program is the program that will open and execute the saved file.

When data is saved in a particular file format and in a particular version, it is assumed that the data will always be available for use. Unfortunately, file formats, program versions and application programs tend to fluctuate in popularity. A file format or application program that was popular just a few years ago may be completely out of vogue today. Similarly, new versions of existing application programs may supersede existing versions. This leads to the predicament in which data saved in a particular file format and version may be unavailable to a new application program or to a new version of an existing application program. Said differently, when data is saved in a particular file format and that file format is superseded by another file format, the original data may be irretrievably lost. Some application programs are capable of opening a superseded file format, but this is typically problematic, as some portions of the original data may be lost or may be inaccessible by the new application program. Similarly, while new versions of application programs may be capable of opening files created and saved in older versions of the application program, some data may be lost.

Therefore, it would be desirable to ensure that data saved in a particular file format and version is always available, even if the file format, version and the original application program are no longer available.

SUMMARY OF THE INVENTION

The invention provides a system and method for propagating data saved in one file format to another file format. The invention may be conceptualized as a system located on a computer for propagating data saved in one file format to another file format, comprising a first data file saved in a first file format and a software module associated with the first data file. The software module includes at least one additional file format definition. An executable software module is associated with the first data file and is configured to associate the additional file format with the first data file.

The invention may also be conceptualized as a method for propagating data saved in one file format to another file format, the method comprising the steps of saving a first data file in a first file format, associating a software module with the first data file, the software module including at least one additional file format definition, and associating the additional file format with the first data file by using an executable software module.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIG. 5 is a graphical illustration representing one manner in which the data propagation system and method of the invention may be implemented using a graphical user interface;

FIG. 6 is a graphical representation of a dialog box accessed through the file menu of FIG. 5;

DETAILED DESCRIPTION OF THE PREFERRED EMBODIMENT

Figure 1:
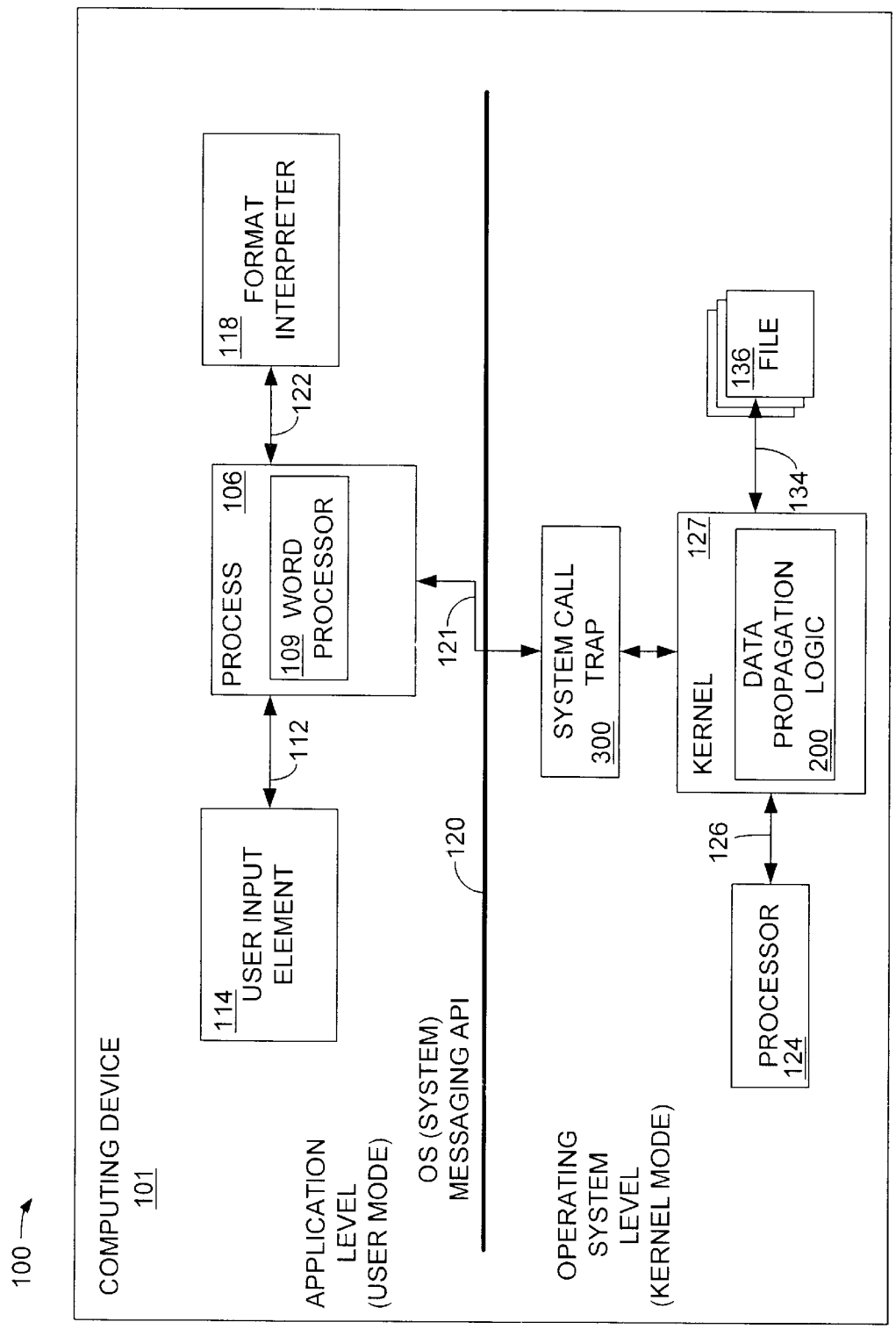
FIG. 1 is a schematic view illustrating the data propagation system in accordance with an aspect of the invention.

The invention described hereafter is applicable to any file format saved on a computer system and is applicable to all computer application programs. Furthermore, while described below in a single computer environment, the system and method for propagating data saved in one file format to another file format can be implemented in a networked computing arrangement in which a number of computing devices communicate over a local area network (LAN) or over a wide area network (WAN).

The system and method for propagating data saved in one file format to another file format can be implemented in hardware, software, firmware, or a combination thereof. In the preferred embodiment(s), the invention is implemented in software or firmware that is stored in a memory and that is executed by a suitable instruction execution system. If implemented in hardware, as in an alternative embodiment, the invention can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The program for propagating data saved in one file format to another file format, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Turning now to the drawings, FIG. 1 is a schematic view illustrating the data propagation system 100 in accordance with an aspect of the invention. Data propagation system 100 includes process 106 in communication with format interpreter 118 via connection 122. A process is invoked each time that an application program is launched. For example, process 106 is invoked when word processor 109 is launched. Word processor 109 is commonly referred to as an "application program." When word processor 109 is launched, a process (such as process 106) corresponding to the word processor application 109 is created within computing device 101. Process 106 communicates with system call trap 300 using system messages communicated via operating system (OS) messaging application programmers interface (API) 120. Although illustrated using word processor 109, the program executed can be any application program running on computing device 101.

User input element 114 allows user commands to be exchanged with process 106 via connection 112. User input element 114 can be, for example, a keyboard, mouse, stylus, or any other means by which information may be input to an application program. User input element 114 may also communicate a voice or sound input to process 106. Commands may be, for example, keystrokes to enter data into a word processing document or mouse clicks to open and manipulate a file.

Computing device 101 also includes OS messaging API 120. The functionality described above with regard to process 106 occurs at the application level, or what is referred to as the "user mode." The functionality to be described below, and on the opposite side of API 120 from the user mode, occurs in what is known as the operating system level, also referred to as the "kernel mode." For example, process 106 communicates with kernel 127 through system call trap 300 via connection 121. The communication between the process 106 and the kernel 127 occurs using API 120 through the use of what are known as "messaging calls." The messaging calls allow those processes operating in the user mode to communicate via the API 120 with those elements operating in the kernel mode.

Kernel 127 includes data propagation logic 200 of the invention. Kernel 127 communicates via connection 126 with processor 124 and communicates with file 136 via connection 134. Illustratively, file 136 is a file that is accessed by, for example, process 106. For example, file 136 can be an executable program file, such as a word processing document that word processor 109 desires to access. Typically, there are many executable files 136 maintained in a storage device (not shown) residing within computing device 101. File 136 is representative of one or more executable files associated with any application program that might be running on computing device 101.

File 136 is typically accessed by process 106 when, in response to user input, process 106 is commanded to, for example, open the file 136. In response to an open file command received from user input element 114, process 106 sends a "load file" message to kernel 127 via connection 121 and API 120. The kernel 127 retrieves the file 136 when instructed. Furthermore, the kernel 127 includes the data propagation logic 200 of the invention. The process 106 will first determine the file extension associated with the file 136, and if recognized, will attempt to open the file. If the process 106 recognizes the extension, it will open the file and attempt to interpret the information in the file 136 for presentation to a user. The process 106 will, in accordance with the recognized format as determined by the file extension associated with the file 136, analyze a header associated with the file 136 and will open the file.

Process 106 communicates with format interpreter 118 via connection 122 to analyze and interpret the format associated with file 136. In accordance with an aspect of the invention, the contents, or inventory, of the format interpreter 118 are chosen so as to enable the data propagation logic 200 to access the appropriate file conversion intermediary to convert a file from one format to another. Accordingly, any file conversion intermediary can be stored and available for use in format interpreter 118. For example, many file formats, such as XML, TIFF, JPEG, are well known and published, and many others, such as PDF, DOC, RTF, have well known outputs that can be readily converted to another format. These, and other, formats can be installed in the format interpreter 118 for use by the data propagation logic 200 to enable the conversion of the file 136 from one file format to another. The manner in which these file conversion intermediaries can be accessed will be described below.

The format interpreter 118 will analyze and parse the file extension associated with the file 136 and the version in which the file was last saved (word processor 109) from header information associated with the file 136. In this manner, the format interpreter 118 obtains both the format and the version of the file 136 and communicates this information to the process 106 via connection 122.

In accordance with an aspect of the invention, system call trap 300 intercepts system API message calls destined for kernel 127 from process 106. System call trap 300, in cooperation with kernel 127 uses the data propagation logic 200 to determine the file format and version. Although shown as residing within kernel 127, the data propagation logic 200, which is responsible for generating the final file that is to be accessed, can reside anywhere in the search path for the computing device 101. The search path includes all directories in which the computing device 101 will search for the data propagation logic 200.

As an example of the operation of an aspect of the invention, the word processor 109 requests services (such as opening a file, reading a directory, allocating memory, etc.) from the kernel 127 by issuing a system API message call via connection 121 via API 120. The kernel 127 responds to those system API message calls by invoking the data propagation logic 200 of the invention to determine whether the file should be converted to a different file format or version and if so, whether the file includes sufficient information to enable the conversion.

In accordance with an aspect of the invention, file 136 includes an attached software module (to be described with respect to FIGS. 2A and 2B), which allows the file 136 to be accessed and interpreted by process 106 even if the file 136 is stored in a format and version different from that of process 106. This software module may contain the file specifications for any, some or all possible file formats. In addition, an executable module attached to the file 136 will act on the header portion of the file 136 (if the extension or version changes), the data portion of file 136 (as necessary to transform the file from one format to another), and the file specifications (since a new file will ultimately be formed). For example, if the file 136 is a text file and the word processor 109 associated with process 106 is, for example, the word processor sold under the trademark MICROSOFT® word, the software module including the file specifications and the executable module attached to the file 136 will allow the word processor 109, and the process 106 to interpret the file 136, even though the file 136 is of a format different than that of the associated application program 109. In accordance with an aspect of the invention, the inventory of the format interpreter 118 may include a rich, intermediate specification that encompasses all known (published or known outputs) elements of all file formats. This intermediate specification can be described by, for example, an XML (extensible markup language) DTD (data type definition), but could be also be defined in many other formats, such as a database or look-up table. For example, assume that one format (such as .doc) produces output types A and B, but not C. Another format (such as .pdf) produces output types B and C, but not A. The intermediate specification associated with the format interpreter 118 (FIG. 1) should accommodate output types A, B and C, and have the ability to translate between them, or ignore them if translation between them is not possible.

Figure 2:
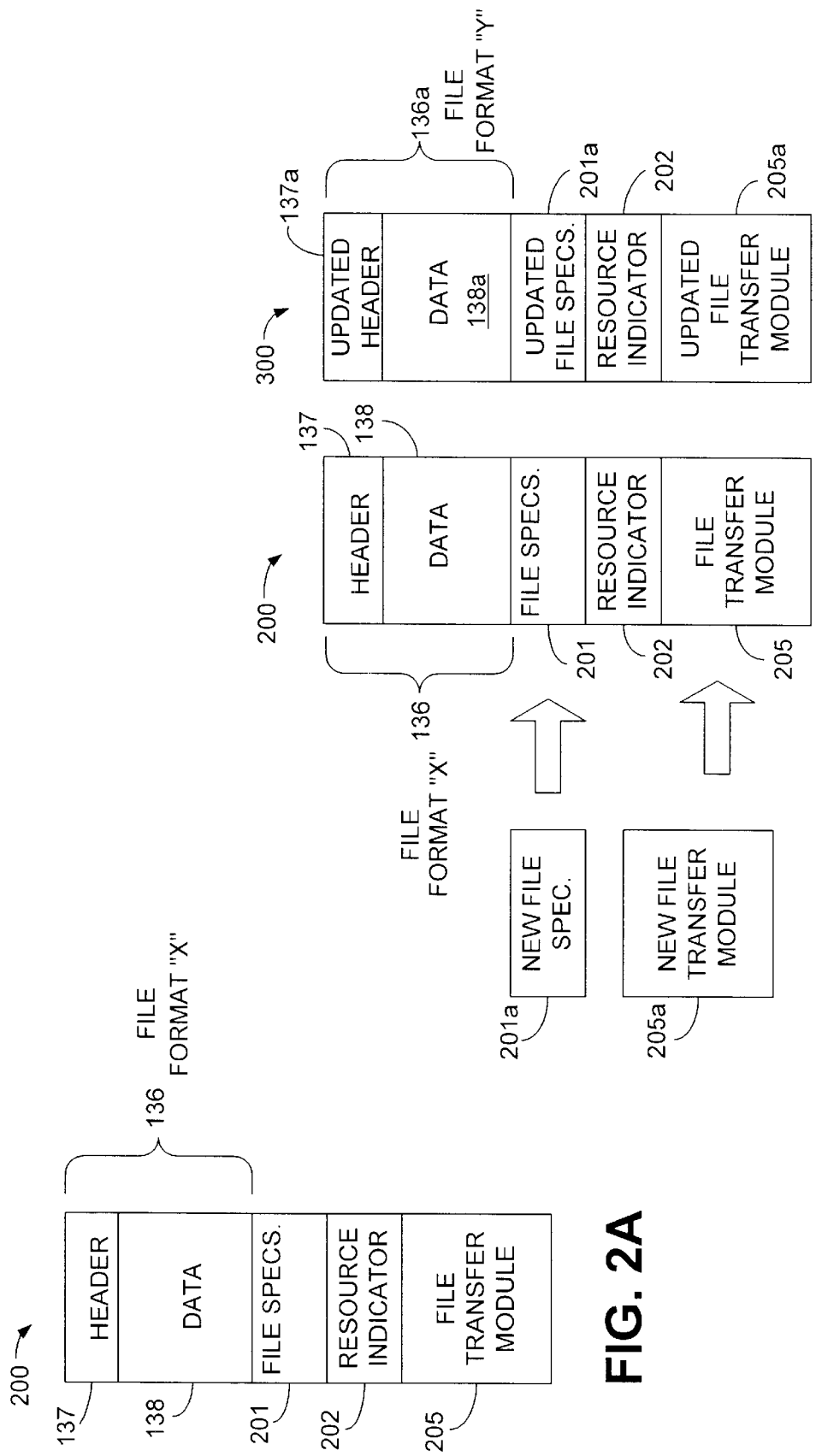
FIG. 2A is a block diagram illustrating the data propagation file structure of the invention.
FIG. 2B is a block diagram illustrating the transformation of the data propagation file structure of FIG. 2A in a first format to a data propagation file structure in a second format.

FIG. 2A is a block diagram illustrating the data propagation file structure 200 of the invention. Data propagation file structure 200 includes file 136, which includes header 137 and data 138. File 136 is of a first file format, hereafter referred to as format "X" for simplicity. The file 136 can be in any format and is shown as format "X" for illustrative purposes only. File specification module 201 is appended to file 136. File specification module 201 includes the file specifications necessary to convert the data 138 contained in file 136 into another file format. Said another way, file 136 can be converted to any other file format so long as the file specifications for the new format are present in file specification module 201.

Resource indicator 202 is an optional software module that can be attached, or appended, to file 136 and will be described in further detail below. File transfer module 205 is an executable file that is also attached, or appended, to file 136. In accordance with an aspect of the invention, when it is desirable to convert file 136 from one format to another (for example from format "X" to format "Y") file transfer module 205 includes logic that uses the information in file specification module 201 to act on the header 137 and data 138 contained in file 136 in order to transform the file 136 from format "X" to format "Y". The file transfer module 205 is an executable file that may include all the information necessary to convert the file 136 from one format to another. Alternatively, in order to prevent the data propagation file structure 200 from becoming excessively large, resource indicator 202 can be employed in order to direct the file transfer module 205 to a remotely located executable module, which will perform the file format conversion in cooperation with the format interpreter 118 (of FIG. 1). For example, the resource indicator 202 may be a uniform resource locator (URL) that points to a local or remote database containing executable files. Such a database may be located locally on the computing device 101 (FIG. 1) or may be located on a server (to be described below with respect to FIG. 3) and be accessible via a network such as the World Wide Web (WWW).

FIG. 2B is a block diagram illustrating the transformation of data propagation file structure 200 in format "X" to a data propagation file structure 300 in format "Y". As illustrated in FIG. 2B, a new (updated) file specification module 201a is appended to file 136, replacing file specification module 201. Similarly, a new file transfer module 205a is appended to file 136, replacing file transfer module 205. In this manner, data propagation file structure 300 is created in a format "Y," which includes file 136a, updated file specification module 201a, and updated file transfer module 205a. It should be noted that data propagation file structure 300 still includes resource indicator 202 as described above.

Figure 3:
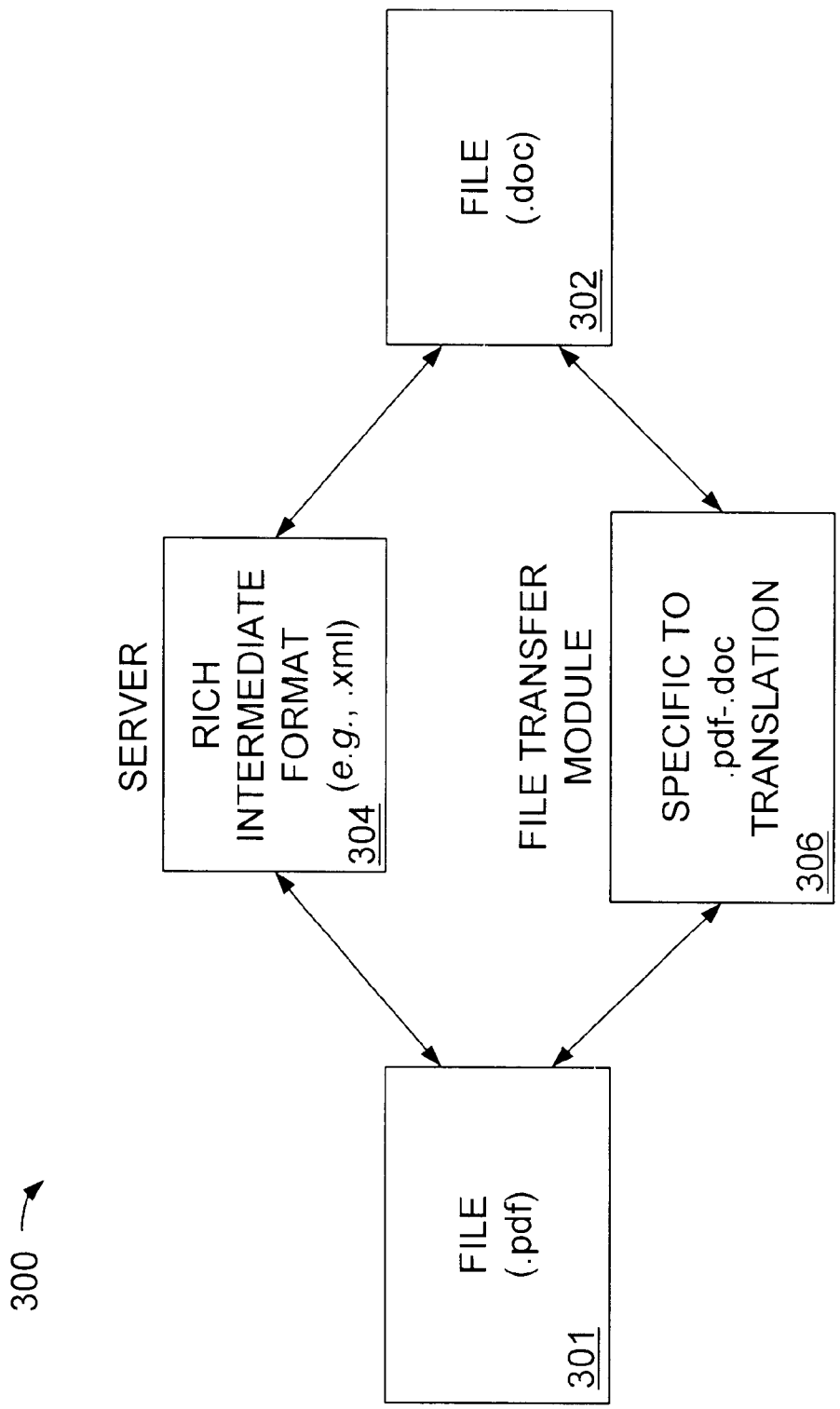
FIG. 3 is a block diagram providing a high level description of the conversion of a file from one file format to another.

FIG. 3 is a block diagram providing a high level description of the conversion of a file from one file format to another. In one aspect of the invention, and for example purposes only, a file 301 is in a .pdf file format and it is desirable to convert that document into a .doc file format. One manner of accomplishing this is to attach a file specification module (201 of FIG. 2A) and a file transfer module 205 (205 of FIG. 2A) to the file and perform a file translation as indicated in box 306, resulting in the transformation of the .pdf file 301 to the .doc file 302. Alternatively, the resource indicator (202 of FIG. 2A) can include a pointer to the server 304 in order to invoke the appropriate file conversion intermediary contained in the format interpreter (118 of FIG. 1) to perform the file conversion.

Figure 4:
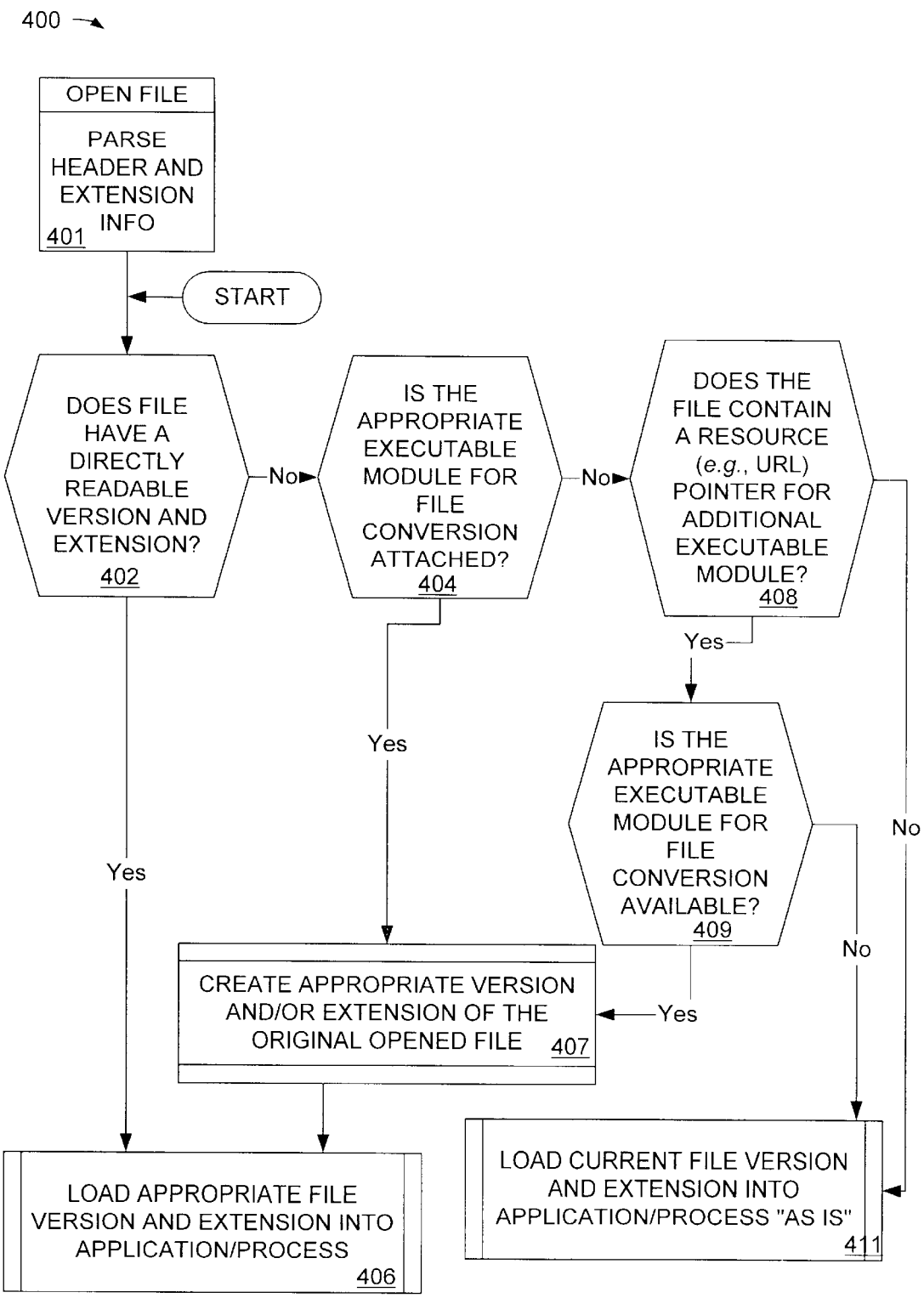
FIG. 4 is a flow chart illustrating the operation of an aspect of the data propagation system and method of the invention.

FIG. 4 is a flow chart illustrating the operation of an aspect of the data propagation system and method of the invention. The flow chart of FIG. 4 shows the architecture, functionality, and operation of a possible implementation of the data propagation system and method of the invention. In this regard, each block represents a module, segment, or portion of code, which comprises one or more executable instructions for implementing the specified logical function (s). It should also be noted that in some alternative implementations, the functions noted in the blocks may occur out of the order noted in FIG. 3. For example, two blocks shown in succession in FIG. 4 may in fact be executed substantially concurrently or the blocks may sometimes be executed in the reverse order, depending upon the functionality involved, as will be further clarified below.

With reference now to FIG. 4, in block 401 a file, such as file 136 of FIG. 1, is opened. As described above, the format interpreter 118 (FIG. 1) parses the header 137 and the extension information from the file 136. In block 402, it is determined whether the open file has a directly readable version and extension. If the file does have a directly readable version and extension, then in block 406 the appropriate file version and extension are loaded into the process 106 (FIG. 1) and the file is opened and presented to a user. If, however, in block 402 it is determined that the file does not have a directly readable version and extension, then, in block 404 it is determined whether an appropriate executable module (file transfer module 205 of FIG. 2A) is attached to the file 136 to allow format conversion of the file. For example, referring back to FIG. 2A, it is determined in block 404 whether the file transfer module 205 is the appropriate module for converting the file 136 into a format that process 106 and application program 109 (FIG. 1) can access.

If it is determined in block 404 that the appropriate file transfer module 205 is attached to the file 136, then in block 407 the executable module (file transfer module 205 of FIG. 2A) acts on the header 137 (if the extension or version changes), data 138 (as necessary to transform the file), and file specification module 201 (since a new file will be formed) to transform the file from the format in which it was saved to a new file format. In this manner, an appropriate version and/or extension of the original file is created. In accordance with this aspect of the invention, the file 136, not the application program 109, initiates the file transfer module 205. In this manner, the file 136 includes sufficient information, through the attached file transfer module 205, to allow file format conversion.

If, in block 404, it is determined that an appropriate executable module is not attached to the file 136, then in block 408 it is determined whether the file 136 contains a resource indicator, 202 of FIG. 2A, which points to an appropriate location at which information for file conversion may be stored. For example, resource indicator 202 may include a pointer to the server 304 (FIG. 3), which may contain a format interpreter 118 (FIG. 1), which may contain an appropriate intermediate format for file conversion in the form of another executable module, similar to the executable module 205. If it is determined in block 408 that the file 136 indeed contains a resource indicator 202, then in block 409 it is determined whether an appropriate executable module is available for the file conversion. If the appropriate executable module is available, then the process proceeds to block 407 where the executable module acts on the header 137 (if the extension or version changes), data 138 (as necessary to transform the file), and file specs 201 themselves (since a new file will be formed) to transform the file from the format in which it was saved to a new file format as described above.

If the appropriate executable module is not available, then, in block 411, the kernel 127 (FIG. 1) will load the current file version and extension into the process 106 (FIG. 1) as is. If it is determined in block 408 that the file does not contain a resource indicator 202 for an additional executable module, then the process proceeds to block 411 as described above.

FIG. 5 is a graphical illustration representing one manner in which the data propagation system and method of the invention may be implemented using a graphical user interface. For example, a user of a computing device, such as computing device 101, may position a pointing device, such as that controlled by a mouse, over an icon representing file 136. By "right clicking" the mouse button, the file menu 450 could be displayed to a user. One of the options in file menu 450 is entitled "Properties." By left clicking on the "Properties" option, a dialog box 460, such as that shown in FIG. 6, can be opened and presented to the user.

However, in a particular embodiment, the data propagation logic 200 (FIG. 1) can be automatically invoked. For example, as known to those having ordinary skill in the art, the application program 109 may be registered with the computer registry maintained in computing device 101. The computer registry stores all of the computer attributes. In this manner, the data propagation logic 200 can be associated with the application program 109. Then, when a file open command is attempted (and if the requesting application program is of a different version or a different format than the one that created or last saved it) the data propagation logic 200 will attempt to convert the file to a format and version that the requesting program can interpret and display. For example, if a user attempts to open a PDF file using MICROSOFT® word (such as described above with respect to FIG. 3), the data propagation logic 200 will attempt to convert information from PDF to a word-usable form (with, for example, a dialog box with "OK to convert" on it). This "translated" version of the file can then be placed on the clipboard (i.e. unsaved) so that the original PDF file is retained without overwrite and possible loss of information.

FIG. 6 is a graphical representation of a dialog box 460 accessed through the file menu 450 of FIG. 5. The "Properties" dialog box 460 corresponds to the "Properties" option in file menu 450 of FIG. 5. The properties dialog box 460 includes tab boxes 462a–462f. Tab box 462b, is the "file transfer" tab box. By activating the file transfer tab box 462b, a user could be presented with a list of other file formats and file versions into which the file 136 can be converted. Once a user chooses a file format and version, the data propagation logic 200 (FIG. 1) creates a new file in the chosen file format. The new file could also contain the executable module (file transfer module 205a of FIG. 2B) so that the file 136 could be updated in the future, if necessary. Alternatively, the data propagation logic 200 can be accessed using pop-up menus, voice-activated menus, or any other mechanism for issuing commands.

Figure 7:
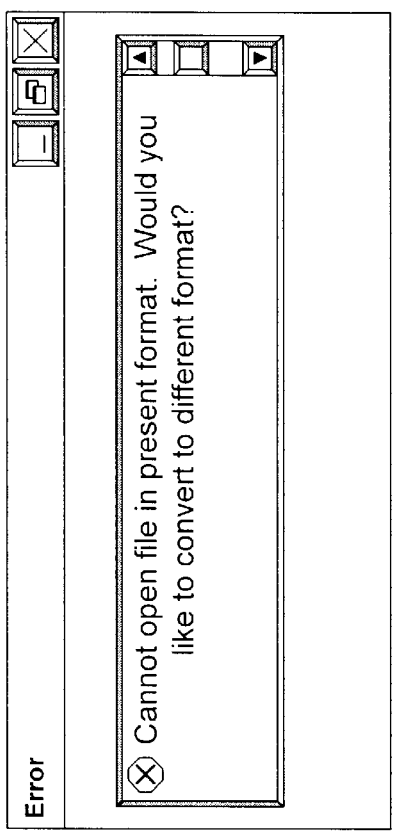
FIG. 7 is a graphical representation of an error message that is presented to a user if the application requesting a file is not the application that created or last saved the file.

FIG. 7 is a graphical representation of an error message 470 that is presented to a user if the application 109 requesting the file 136 is not the application that created or last saved the file 136. As shown in FIG. 7, the user will be presented with an error message that asks whether or not the user would like to convert the file 136 to a different format. In this manner, the user can also access properties dialog box 460 of FIG. 6 to convert the file to a new file format and/or version.

Figure 8:
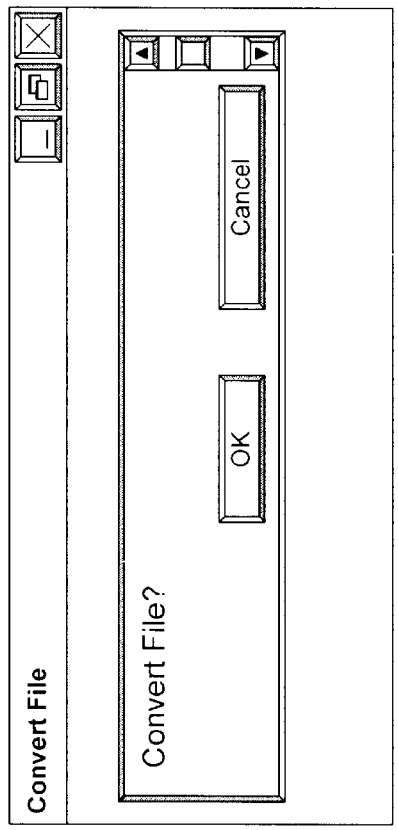
FIG. 8 is a graphical representation of an automated file conversion message that is presented to a user if the application requesting the file is not the application that created or last saved the file.

FIG. 8 is a graphical representation of an automated file conversion message 480 that is presented to a user if the application 109 requesting the file 136 is not the application that created or last saved the file 136. After the error message of FIG. 7 is presented to a user, the data propagation logic 200 can attempt to automatically convert the file 136 as described above with respect to FIG. 6. Referring to FIG. 8, when the data propagation logic 200 attempts to automatically convert the file 136, the user can be presented with dialog box 480, which allows the user to determine whether automatic file conversion should proceed or be canceled.

It will be apparent to those skilled in the art that many modifications and variations may be made to the preferred embodiments of the present invention, as set forth above, without departing substantially from the principles of the present invention. For example, the present invention can be used to create a secure execution environment for any computer program that uses attributes to define access and security parameters. All such modifications and variations are intended to be included herein within the scope of the present invention, as defined in the claims that follow.

What is claimed is:

1. A system located on a computer for propagating data saved in one file format to another file format, comprising:

a first real data file saved in a first file format on a computing device;

a software module appended to and part of said first real data file, said software module including at least one additional file format definition; and an executable software module appended to and part of said first real data file, said executable software module configured to associate said additional file format with said first real data file and change the file format of the first real data file to create a new real data file associated with said additional file format, the new real data file located on the computing device, wherein said first real data file initiates the operation of said executable software module, and wherein said software module and said executable software module are updated and appended to and become part of said new real data file.

2. The system of claim 1, wherein said executable software module is accessible through any of the group consisting of a pull-down menu, a pop-up menu and a voice activated menu.

3. The system of claim 1, further comprising a plurality of file format definitions associated with said software module.

4. The system of claim 1, wherein an updated executable software module is associated with said first real data file.

5. The system of claim 1, wherein an updated software module is associated with said first real data file.

6. The system of claim 1, wherein said executable software module uses said additional file format to create a second real data file, said second real data file being of said additional file format.

7. The system of claim 1, wherein said executable software module is accessed remotely via a resource indicator attached to said first real data file.

8. The system of claim 7, wherein said executable software module is accessible via the World Wide Web (WWW).

9. The system of claim 1, wherein said executable software module is automatically activated by said first real data file.

10. A method for propagating data saved in one file format to another file format, the method comprising the steps of:

saving a first real data file in a first file format on a computing device;

appending a software module to said first real data file, said software module including at least one additional file format definition;

associating, using an executable software module appended to said first real data file, said additional file format with said first real data file; and changing the file format of the first real data file to create a new real data file associated with said additional file format, the new real data file located on the computing device, wherein said first real data file initiates the operation of said executable software module, and wherein said software module and said executable software module are updated and appended to and become part of said new real data file.

11. The method of claim 10, further comprising the step of accessing said executable software module through any of the group consisting of a pull-down menu, a pop-up menu and a voice activated menu.

12. The method of claim 10, further comprising the step of associating a plurality of file format definitions with said software module.

13. The method of claim 10, further comprising the step of updating said executable software module associated with said first real data file.

14. The method of claim 10, further comprising the step of updating said software module associated with said first real data file.

15. The method of claim 10, further comprising the step of creating a second real data file having said additional file format.

16. The method of claim 10, further comprising the step of accessing said executable software module remotely using a resource indicator attached to said first real data file.

17. The method of claim 16, further comprising the step of accessing said executable software module remotely via the World Wide Web (WWW).

18. The method of claim 10, further comprising the step of automatically activating said executable software module using said first real data file.

19. A computer readable medium having a program for propagating data saved in one file format to another file format, the program including logic for performing the steps of:

saving a first real data file in a first file format on a computing device;

appending a software module to said first real data file, said software module including at least one additional file format definition;

associating, using an executable software module appended to said first real data file, said additional file format with said first real data file; and changing the file format of the first real data file to create a new real data file associated with said additional file format, the new real data file located on the computing device, wherein said first real data file initiates the operation of said executable software module, and wherein said software module and said executable software module are updated and appended to and become part of said new real data file.

20. The program of claim 19, further comprising logic for performing the step of accessing said executable software module through any of the group consisting of a pull-down menu, a pop-up menu and a voice activated menu.

21. The program of claim 19, further comprising logic configured to perform the step of associating a plurality of file format definitions with said software module.

22. The program of claim 19, further comprising logic configured to perform the step of updating said executable software module associated with said first real data file.

23. The program of claim 19, further comprising logic configured to perform the step of updating said software module associated with said first real data file.

24. The program of claim 19, further comprising logic configured to perform the step of creating a second real data file having said additional file format.

25. The program of claim 19, further comprising logic configured to perform the step of accessing said executable software module remotely using a resource indicator attached to said first real data file.

26. The program of claim 19, further comprising logic configured to perform the step of accessing said executable software module via the World Wide Web (WWW).

27. The program of claim 19, further comprising logic configured to perform the step of automatically activating said executable software module using said first real data file.

* * * * *